United States Patent
Ragusa et al.

(10) Patent No.: US 11,949,672 B2
(45) Date of Patent: Apr. 2, 2024

(54) AUTHENTICATION BASED ON CHAIN OF STRINGS GENERATED FROM SECRET STRING

(71) Applicant: International Business Machines Corporation, Armonk, NY (US)

(72) Inventors: Roberto Ragusa, Rome (IT); Remo Freddi, Ronciglione (IT); Chiara Conti, Rome (IT); Alessandra Asaro, Rome (IT)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 17/649,423

(22) Filed: Jan. 31, 2022

(65) Prior Publication Data

US 2023/0247017 A1 Aug. 3, 2023

(51) Int. Cl.
*H04L 9/40* (2022.01)
*G06F 21/31* (2013.01)
(Continued)

(52) U.S. Cl.
CPC .......... *H04L 63/083* (2013.01); *H04L 63/102* (2013.01); *H04L 63/20* (2013.01)

(58) Field of Classification Search
CPC . H04L 9/40; H04L 9/32; H04L 63/083; H04L 63/102; H04L 63/20; G06F 21/46; G06F 21/31
See application file for complete search history.

(56) References Cited

U.S. PATENT DOCUMENTS

| 10,778,450 B1 | 9/2020 | Griffin |
| 2002/0002678 A1 | 1/2002 | Chow |

(Continued)

FOREIGN PATENT DOCUMENTS

| CN | 110602142 A | 12/2019 |
| CN | 112217632 A | 1/2021 |

(Continued)

OTHER PUBLICATIONS

Iacona Louis J., ": Lamport's one-time password algorithm (or, don't talk to complete strangers!)", JavaWorld, Mar. 31, 2009, 4 pages, <https://www.infoworld.com/article/2078022/lamport-s-one-time-password-algorithm-or-don-t-talk-to-complete-strangers--.html?page=2>.

(Continued)

*Primary Examiner* — Jayesh M Jhaveri
(74) *Attorney, Agent, or Firm* — Stephanie L. Carusillo

(57) ABSTRACT

A solution is proposed for performing authentications. A corresponding method comprises storing a verification string corresponding to applying a one-way function iteratively starting from a secret string. An authentication request is received in association with an authentication string (or more) being generated by applying the one-way function iteratively starting from the secret string for a lower number of times. A result of the authentication request is determined by comparing the verification string with a comparison string being generated by applying the one-way function to the authentication string (or a few times iteratively). Corresponding computer programs and a computer program products for performing the method are also proposed. Moreover, corresponding systems for implementing the method are proposed.

15 Claims, 8 Drawing Sheets

(51) Int. Cl.
    *G06F 21/46*     (2013.01)
    *H04L 9/32*     (2006.01)

(56) References Cited

U.S. PATENT DOCUMENTS

| | | | | |
|---|---|---|---|---|
| 2003/0097559 A1* | 5/2003 | Shimizu | ............... | H04L 9/3271 713/161 |
| 2019/0036698 A1 | 1/2019 | Anglin | | |
| 2019/0245842 A1* | 8/2019 | Ferreira | ................. | G06F 21/31 |

FOREIGN PATENT DOCUMENTS

| | | | | |
|---|---|---|---|---|
| JP | 2007058633 A | * | 3/2007 | |
| JP | 4259021 B2 | * | 4/2009 | |

OTHER PUBLICATIONS

International Searching Authority, "The International Search Report and the Written Opinion of the International Searching Authority, or the Declaration", Applicant's or agent's file reference, International application No. PCT/EP2023/052234, International filing date Jan. 31, 2023, dated Apr. 19, 2023, 12 pages.

Lamport, Leslie, "Password authentication with insecure communication", Communications of the ACM, Association for Computing Machinery, Inc, United States, vol. 24, No. 11, Nov. 1, 1981, pp. 770-772.

"Password", In Wikipedia, Downloaded from the Internet on Nov. 30, 2021, Last Updated on Nov. 30, 2021, 21 pgs., <https://en.wikipedia.org/wiki/Password>.

"Public-key Cryptography", In Wikipedia, Downloaded from the Internet on Nov. 30, 2021, Last Updated on Nov. 21, 2021, 10 pgs., <https://en.wikipedia.org/wiki/Public-key_cryptography>.

* cited by examiner

AUTHENTICATION BASED ON CHAIN OF STRINGS GENERATED FROM SECRET STRING

BACKGROUND

The present disclosure relates to the information technology field. More specifically, this disclosure relates to authentication based on secret strings.

Authentication is commonplace in computing systems to confirm identity of users (such as persons) attempting to access them. This process is aimed at restricting access to the computing systems selectively, so as to ensure that only the users being actually authorized are granted the required accesses thereto (such as for invoking services, executing actions and so on). Authentication generally leverages (digital) credentials that should be possessed by the (authorized) users to prove their identity. Particularly, one of the most widespread authentication techniques is based on secret strings (such as passwords) that are supposed to be known to corresponding users only.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of exploiting a chain of strings generated from a secret string.

Particularly, an aspect provides an authentication method (under the control of a verifier computing system). The method comprises storing a verification string corresponding to applying a one-way function iteratively starting from a secret string. An authentication request is received in association with an authentication string (or more) being generated by applying the one-way function iteratively starting from the secret string for a lower number of times. A result of the authentication request is determined by comparing the verification string with a comparison string being generated by applying the one-way function to the authentication string (or a few times iteratively).

A further aspect provides a software program for implementing this method.

A further aspect provides a corresponding software program product.

A further aspect provides a verifier system for implementing this method.

A further an aspect provides an authentication method (under the control of a claimant computing system). The method comprises generating an authentication string (or more) by applying a one-way function iteratively starting from a secret string. An authentication request in association with the authorization string is submitted to a verifier system to cause its verification as above.

A further aspect provides a software program for implementing this method.

A further aspect provides a corresponding software program product.

A further aspect provides a claimant system for implementing this method.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

According to an aspect of the present invention, there is a method, computer program product and/or system for use with a verifier computing system that performs the following operations (not necessarily in the following order): (i) storing a verification string corresponding to applying a one-way function iteratively starting from a secret string for a number of times equal to a verification number; (ii) receiving a sequence of authentication requests in association with corresponding one or more authentication strings being generated by applying the one-way function iteratively starting from the secret string for corresponding authentication numbers of times decreasing along the sequence below the verification number; (iii) verifying each of the authentication requests by: (a) generating one or more comparison strings by applying the one-way function iteratively starting from each of the authentication strings of the authentication request corresponding comparison numbers of times at most equal to corresponding delta numbers; (iv) determining a result of each authentication request according to a comparison of the comparison strings with the verification string; and (v) updating verification information for verifying a next one of the authentication requests in response to a positive result of each authentication request.

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). Particularly.

DETAILED DESCRIPTION

Figure 1A:
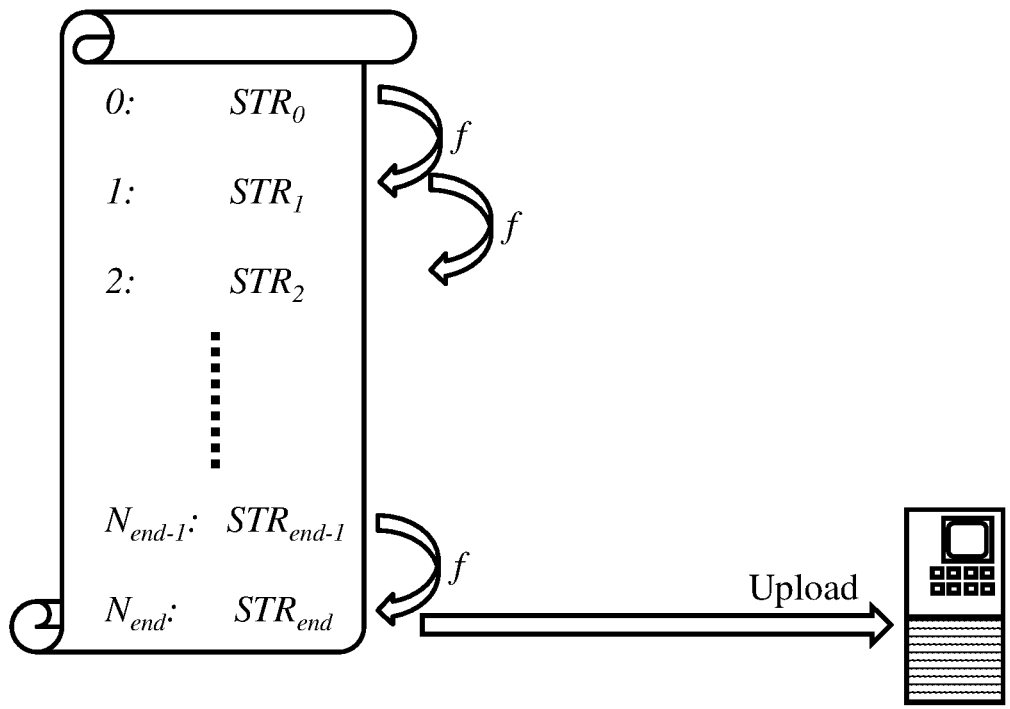
FIG. 1A-FIG. 1F show the general principles of the solution according to an embodiment of the present disclosure.

With reference in particular to FIG. 1A-FIG. 1F, the general principles are shown of the solution according to an embodiment of the present disclosure.

The need of authenticating the users is particularly acute in computing systems with distributed architecture, which may be exposed in a public network potentially allowing uncontrolled access thereto (especially when the network in based on the Internet). During typical authentication operation based on passwords, a user submits information based on his/her password (together with other information, such a userID thereof) to a computer, such as a server, in charge of verifying it. Particularly, in case of a distributed architecture, the information allowing the server to verify the password has to be transmitted from a client of the user to the server over the network. For this purpose, several approaches are available.

For example, in a so called shared-password approach the server stores the password and the client transmits the password to the server; in this case, the server compares the password being received with the password being stored. However, the transmission of the password is at risk of traffic sniffing attacks, since the password may be intercepted during its transmission over the network; moreover, the storing of the password on the server is at risk of data dump attacks, since the password may be read from the server. In both cases, a malicious attacker would be able to use the password later on fraudulently.

In a so called hashed-password approach, the server stores a hash value generated from the password and the client transmits a hash value generated thereon from the password to the server; in this case, the server compares the hash value being received with the hash value being stored. However, the transmission of the hash value is again at risk of traffic sniffing attacks, since the hash value may be intercepted during its transmission over the network by a malicious attacker that then would be able to use it later on fraudulently.

In a so called time-based one-time password approach, the server stores the password, and the client transmits a hash value generated thereon from the password and a coarse time-stamp (remaining the same over a certain period) to the server; in this case, the server compares the hash value being received with a hash value calculated thereon from the password and the same time-stamp. However, the storing of the password on the server is again at risk of data dump attacks, since the password may be read from the server by a malicious attacker that then would be able to use it later on fraudulently.

In alternative, an authentication technique based on private/public keys may be used. For this purpose, a pair of private key and public key is generated for the user; the server stores the public key, and the client stores the private key. The authentication is then based on the exchange of information between the client and the server that is encrypted with one of the private/public keys and decrypted with the other one of the private/public keys. However, these operations are computationally complex and then time-consuming; this adversely affects performance of the server, and it may expose it to the risk of denial-of-service attacks (should the server be flooded with massive requests of authentications). Moreover, the same operations involve a relatively high amount of traffic over the network; this may degrade performance of every application exploiting it.

Because of the above-mentioned reasons, in case of multiple interactions between the client and the server the authentication based on private/public keys is used only during a login of the user to the server. In this phase, a (temporary) shared key is exchanged between the client and the server using the private/public keys. The shared key is then used for the next interactions between the client and the server (being less computationally complex and then faster and involving lower network traffic). However, the shared key has to be stored on the client and on the server; therefore, as above the storing of the shared key exposes the client and the server to the risk of data dump attacks, since the password may be read from them.

Starting from FIG. 1A, a user (claimant) has to be authenticated to an entity (verifier) for confirming its identity. For example, the claimant is a (human) user of a client computing system, or simply client and the verifier is a server computing system, or simply server that may be accessed only by authorized users. The authentication of the user by the server is based on a secret string that is held by the user as a proof of his/her identity. For example, the secret string is a password (or passcode) formed by an arbitrary combination of characters that should be known only to the user.

In the solution according to an embodiment of the present disclosure, the authentication of the user is implemented with a protocol based on a chain of strings. Particularly, during an initial set-up an end string is generated by applying a one-way function iteratively starting from the secret string for an end number of times (for example, on the client). The one-way function is a function that is infeasible to invert in practice. In other words, the one-way function is easy to compute (i.e., this is possible in an acceptable time in practice), whereas it is hard to invert (i.e., this is not possible in an acceptable time in practice). More formally, the one-way function may be defined as a function that may be computed by a polynomial time algorithm, but any polynomial time randomized algorithm attempting to invert it succeeds with negligible probability. The end number is chosen according to the number of authentications that are to be performed starting from the end string. The iterative application of the one-way function means that at each iteration following a first one (applied to the secret string) the one-way function is applied to a result of a previous iteration thereof. Therefore, denoting with $STR_0$ the secret string and with f the one-way function, a string $STR_1=f(STR_0)$ is generated by applying the one-way function once, a string $STR_2=f(STR_1)$ is generated by applying the one-way function twice and so on up to the end string $STR_{end}=f(STR_{end-1})$ that is generated by applying the one-way function for the end number ($N_{end}$) of times. The end string $STR_{end}$ is then uploaded to the server.

Figure 1B:
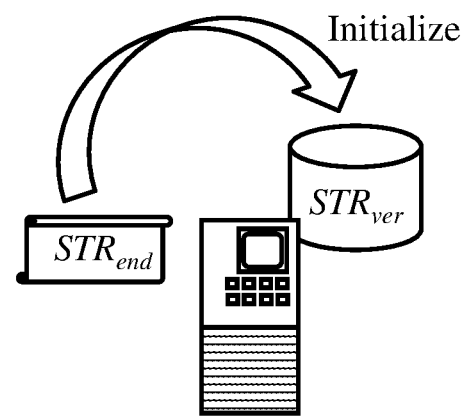

Moving to FIG. 1B, the server receives the end string $STR_{end}$. The servers use the end string $STR_{end}$ to initialize a verification string $STR_{ver}$ that is stored therein. The verification string $STR_{ver}$ has a content (corresponding to the application as above of the one-way function iteratively starting from the secret string $STR_0$ for a verification number $N_{ver}$ of times) that is used to verify the authentications. The verification number $N_{ver}$ is at most equal to the end number $N_{end}$; particularly, the verification number $N_{ver}$ is initially equal to the end number $N_{end}$ and then decrements as the authorizations are granted.

Figure 1C:
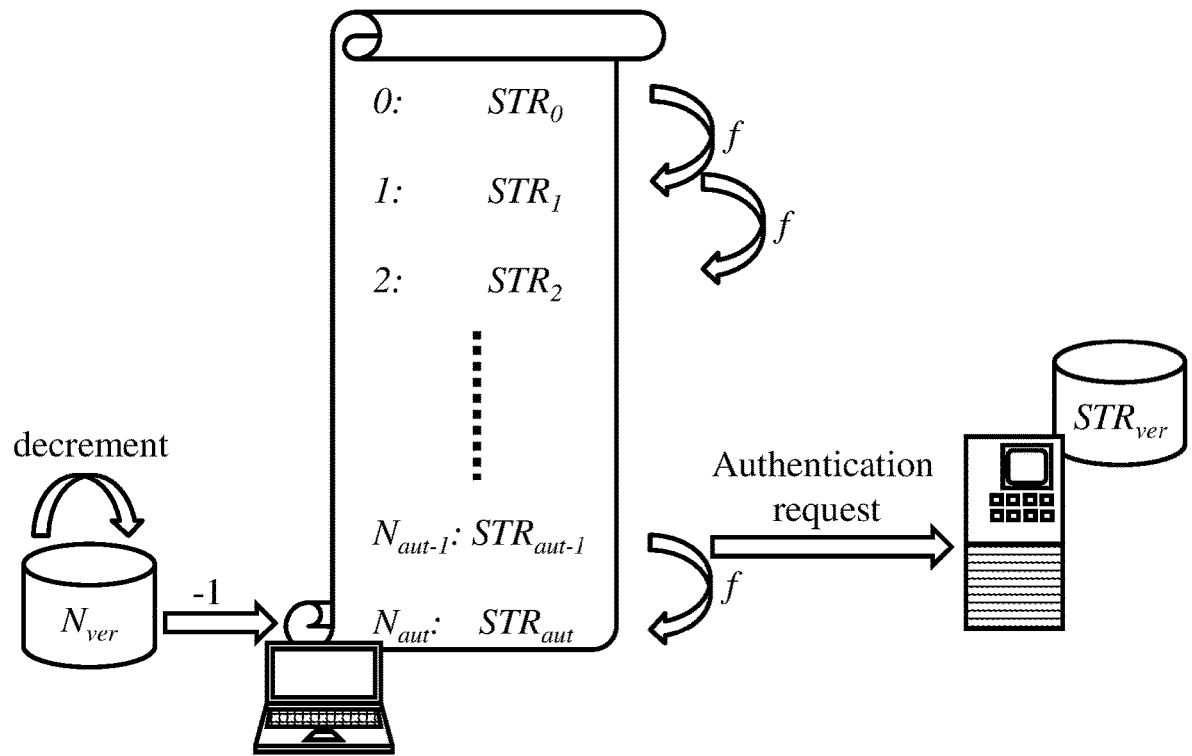

Moving to FIG. 1C, whenever the user needs to authenticate to the server, the client generates an authentication string $STR_{aut}$ (or more). The authentication string $STR_{aut}$ is generated by applying as above the one-way function iteratively starting from the secret string $STR_0$ for an authentication number $N_{aut}$ of times that is (strictly) lower than the verification number $N_{ver}$, i.e., with $STR_1=f(STR_0, STR_2=f(STR_1)$ and so on up to $STR_{aut}=f(STR_{aut-1})$. For example, the verification number $N_{ver}$ is stored in a verification counter in the client that is initialized to the end number $N_{end}$, and the authentication number $N_{aut}$ is set to the verification number $N_{ver}$ decremented by one, i.e., $N_{aut}=N_{ver}-1$. An authentication request is then submitted to the server in association with the authentication string $STR_{aut}$; at the same time, the verification number $N_{ver}$ is decremented accordingly in the verification counter, i.e., $N_{ver}=N_{ver}-1$ in the example at issue.

Figure 1D:
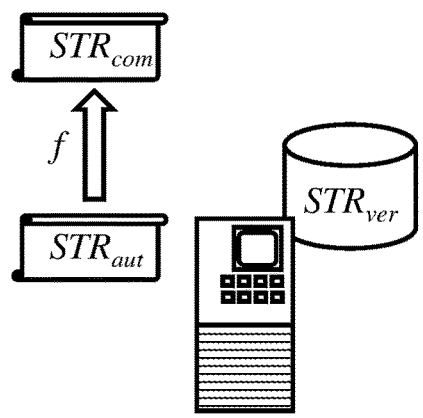

Moving to FIG. 1D, in response to the authentication request the server generates a comparison string $STR_{com}$ (or more). The comparison string $STR_{com}$ is generated by applying the one-way function to the authentication string $STR_{aut}$, i.e., $STR_{com}=f(STR_{aut})$ (with the operation that may be repeated as above iteratively a few times). Therefore, the comparison string $STR_{com}$ has the content that should have been obtained by applying the one-way function for $N_{com}=N_{aut}+1=N_{ver}-1+1=N_{ver}$ number of times (and then the same one of the verification string $STR_{ver}$).

Figure 1E:
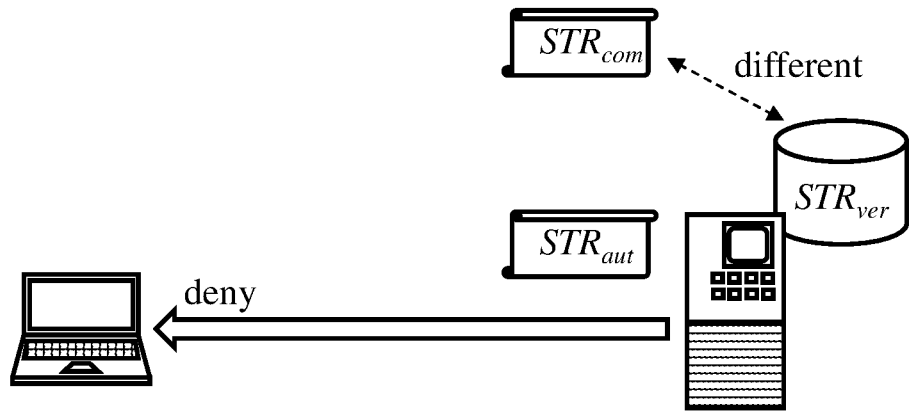

Moving to FIG. 1E, the server compares the comparison string $STR_{com}$ with the verification string $STR_{ver}$ and determines a result of the authentication request accordingly. In this way, the server verifies whether the user is capable of going backwards the chain of strings to a level that has never been disclosed before (from the verification string $STR_{ver}$ to the authentication string $STR_{aut}$); this implies that the user possesses the secret string $STR_0$ that is necessary to perform this operation because of the nature of the one-way function. Therefore, if the comparison string $STR_{com}$ and the verification string $STR_{ver}$ are different the authentication is denied.

Figure 1F:
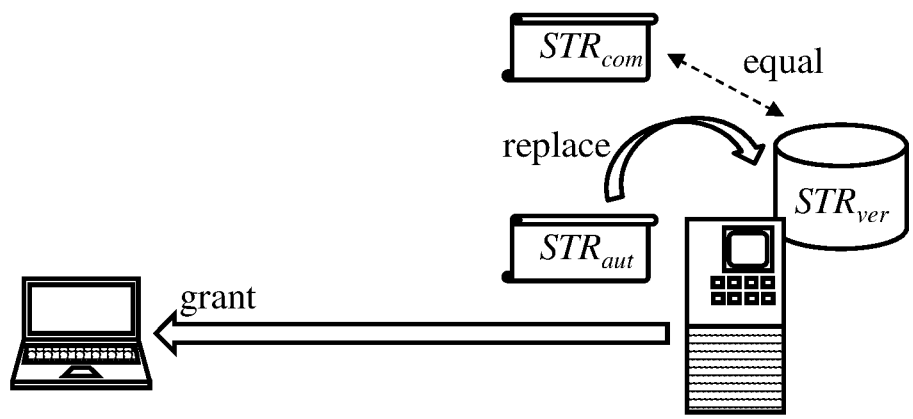

Moving to FIG. 1F, if instead the comparison string $STR_{com}$ and the verification string $STR_{ver}$ are equal, the authentication is granted. In this case, the server replaces the verification string $STR_{ver}$ with the authentication string $STR_{aut}$.

Therefore, the first time the authentication string $STR_{aut}$ is generated by applying the one-way function for $N_{aut}=N_{end}-1$ number of times, and the comparison string $STR_{com}=f(STR_{aut})$ is verified against the verification string $STR_{ver}$ that should have been obtained by applying the one-way function for $N_{ver}=N_{end}$ number of times. A next time the authentication string $STR_{aut}$ is generated by applying the one-way function for $N_{aut}=N_{end}-2$ number of times, and the comparison string $STR_{com}=f(STR_{aut})$ is verified against the verification string $STR_{ver}$ that should have been obtained by applying the one-way function for $N_{ver}=N_{end}-1$ number of times. A still next time the authentication string $STR_{aut}$ is generated by applying the one-way function for $N_{aut}=N_{end}-3$ number of times, and the comparison string $STR_{com}=f(STR_{aut})$ is verified against the verification string $STR_{ver}$ that should have been obtained by applying the one-way function for $N_{ver}=N_{end}-2$ number of times. The same operations are then repeated for any next request of authorization, down to when the authentication string $STR_{aut}$ is generated by applying the one-way function for $N_{aut}=1$ number of times, and the comparison string $STR_{com}=f(STR_{aut})$ is verified against the verification string $STR_{ver}$ that should have been obtained by applying the one-way function for $N_{ver}=2$ number of times.

The above-described solution significantly reduces the risk of security exposures, and especially of traffic sniffing attacks and of data dump attacks.

Particularly, even if a malicious attacker was able to intercept the end string $STR_{end}$ or any authentication strings $STR_{aut}$ during their transmission over the network, this information might not be used later on fraudulently; in fact, neither the end string $STR_{end}$ nor the authentication strings $STR_{aut}$ allow determining next authentication strings $STR_{aut}$ (generated by applying the one-way function for a lower number of times), even if the one-way function is public (because of its nature making it infeasible in practice).

Likewise, even if a malicious attacker was able to read the verification string $STR_{ver}$ from the server, this information might not be used later on fraudulently; in fact, the verification string $STR_{ver}$ as well does not allow determining next authentication strings $STR_{aut}$ (generated by applying the one-way function for a lower number of times), even if the one-way function is public (because of its nature making it infeasible in practice).

Therefore, the proposed solution implements a sort of one-time password, wherein each authentication string $STR_{aut}$ is valid only for a single authentication and may not be used to predict next values thereof. This thanks to the fact that the chain of strings is consumed by the client during the authentications (as the authentication number $N_{aut}$ used to generate the authentication strings $STR_{aut}$ decrements). At the same time, this result is achieved without the need of storing the secret string $STR_0$ in the server. This thank to the fact that only the client needs to know the secret string $STR_0$ to go backwards along the chain of strings to generate the authentication strings $STR_{aut}$ in succession, whereas the server only needs to move forwards the chain of strings to verify that every authentication string $STR_{aut}$ generates the verification string $STR_{ver}$ following it in the chain of strings.

The above-described results are achieved in a quite simple way. In fact, the one-way function used to generate the strings has a relatively low computation complexity and then it is relatively fast. Particularly, the server only has to calculate the one-way function once (or at most a few times) for each authentication request. This has a beneficial effect on its performance and reduces the risk of denial-of-service attacks. The client, even when it has to calculate the one-way function a high number of times, may perform this operation in a relatively short time that is acceptable in most practical situations. For example, considering a chain of 1.000.000 strings (allowing the user to authenticate a corresponding number of times), the generation of each authentication string $STR_{aut}$ in the worst case only takes a few hundreds of μs on a standard client (with the time that decreases as the chain of strings is consumed). For example, the operations required by the solution according to an embodiment of the present disclosure are up to two orders of magnitude faster than the operations required by an authentication technique based on private/public keys (such as 4.000.000 ops using SHA-256 against 40.000 ops using RSA-2048 on a standard laptop).

Moreover, each authentication only requires the transmission of the authentication string $STR_{aut}$ to the server. This has a beneficial effect on the traffic over the network, and then on the performance of every application exploiting it. For example, the amount of data required by the solution according to an embodiment of the present disclosure is up to an order of magnitude lower than the amount of data required by an authentication technique based on private/public keys (such as 20 bytes against 256 bytes using RSA-2048). Particularly, the proposed solution makes it feasible to pass the authentication string directly in the authentication request itself (for example, as a parameter in a URL of the verifier server).

Figure 2:
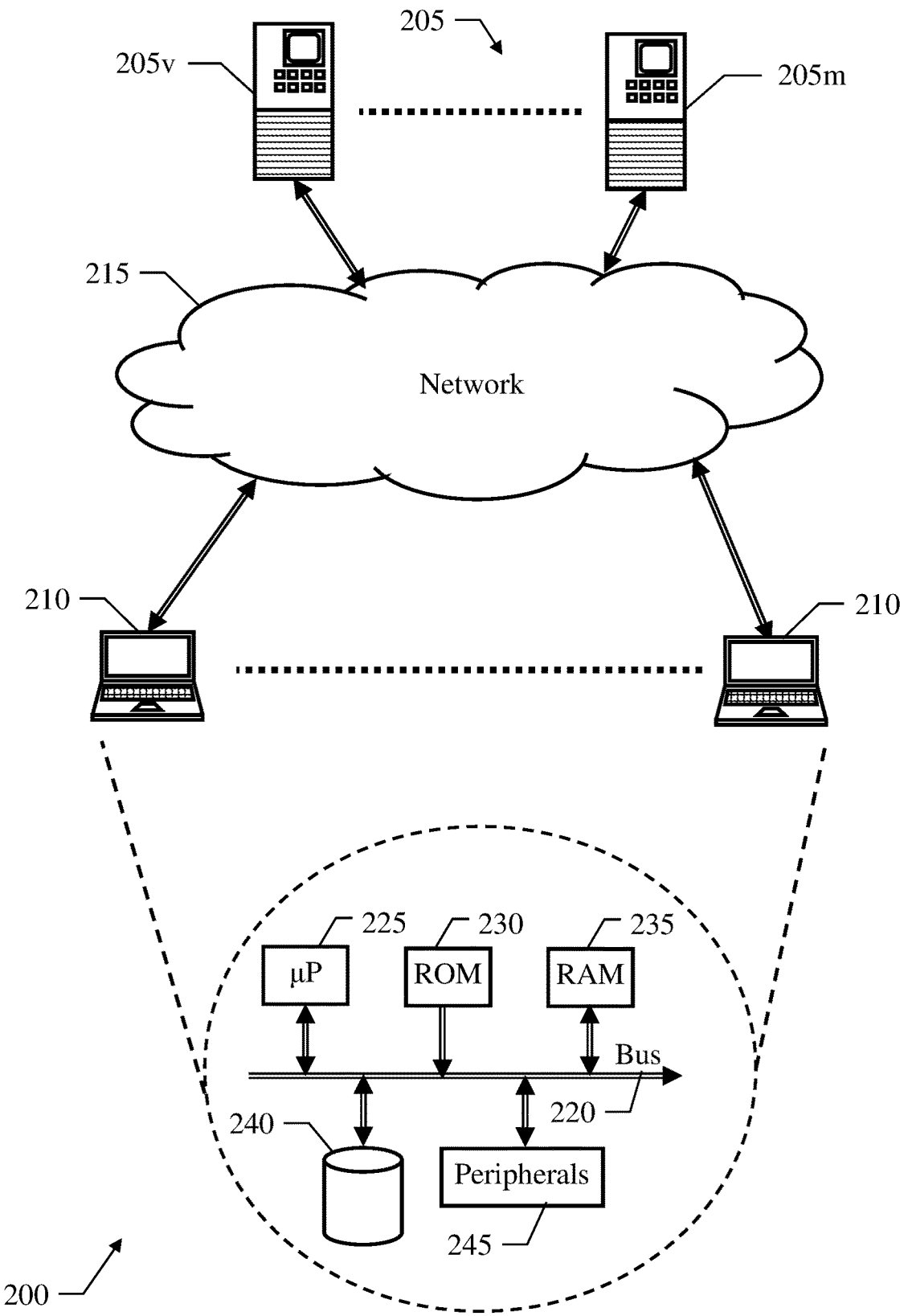
FIG. 2 shows a schematic block diagram of an information technology infrastructure that may be used to implement the solution according to an embodiment of the present disclosure.

With reference now to FIG. 2, a schematic block diagram is shown of an information technology infrastructure 200 that may be used to implement the solution according to an embodiment of the present disclosure.

The information technology infrastructure 200 is based on a client/server model, wherein one or more servers 205 provide services to one or more clients 210. Particularly, one or more of the servers, differentiated as verifier servers 205v, are used to verify authentications of (authorized) users being authorized to access them (for example, for invoking services, executing actions and so on, either directly on them or indirectly via them). Other one or more of the servers, differentiated as metering servers 205m, are instead used to meter the authentications; particularly, each metering server 205m controls the amount of authentications that may be granted to each user registered with one or more verifier servers 250v associated therewith. The clients 210 are used by corresponding users to accesses the servers 205; particularly, as far as relevant to the present disclosure the clients 205 are used to authenticate their users to the verifier servers 250v. Typically, the information technology infrastructure 200 has a distributed architecture with the servers 205 and the clients 210 that communicate among them over a telecommunication network 215 (for example, of global type based on the Internet).

Each of the above-mentioned computing systems (i.e., servers 205 and clients 210) comprises several units that are connected among them through a bus structure 220 at one or more levels (with an architecture that is suitably scaled according to a type of the computing system 205-210). Particularly, a microprocessor (µP) 225, or more, provides a logic capability of the computing system 205-210; a non-volatile memory (ROM) 230 stores basic code for a bootstrap of the computing system 205-210 and a volatile memory (RAM) 235 is used as a working memory by the microprocessor 225. The computing system 205-210 is provided with a mass-memory 240 for storing programs and data, for example, storage devices of a data center wherein each server 205 is implemented or a Solid-State Disk (SSD) for each client 210. Moreover, the computing system 205-210 comprises a number of controllers for peripherals, or Input/Output (I/O) units, 245; for example, as far as relevant to the present disclosure the peripherals 245 of each server 205 comprise a network adapter for plugging the server 205 into the corresponding data center and then connecting it to a console of the data center for its control (for example, a personal computer, also provided with a drive for reading/writing removable storage units, such as of USB type) and to a switch/router sub-system of the data center for its communication with the (telecommunication) network 215, whereas the peripherals 245 of each client 210 comprise a keyboard, a mouse, a monitor, a network adapter for connecting to the network 215 and a drive for reading/writing removable storage units (such as of USB type).

Figure 3:
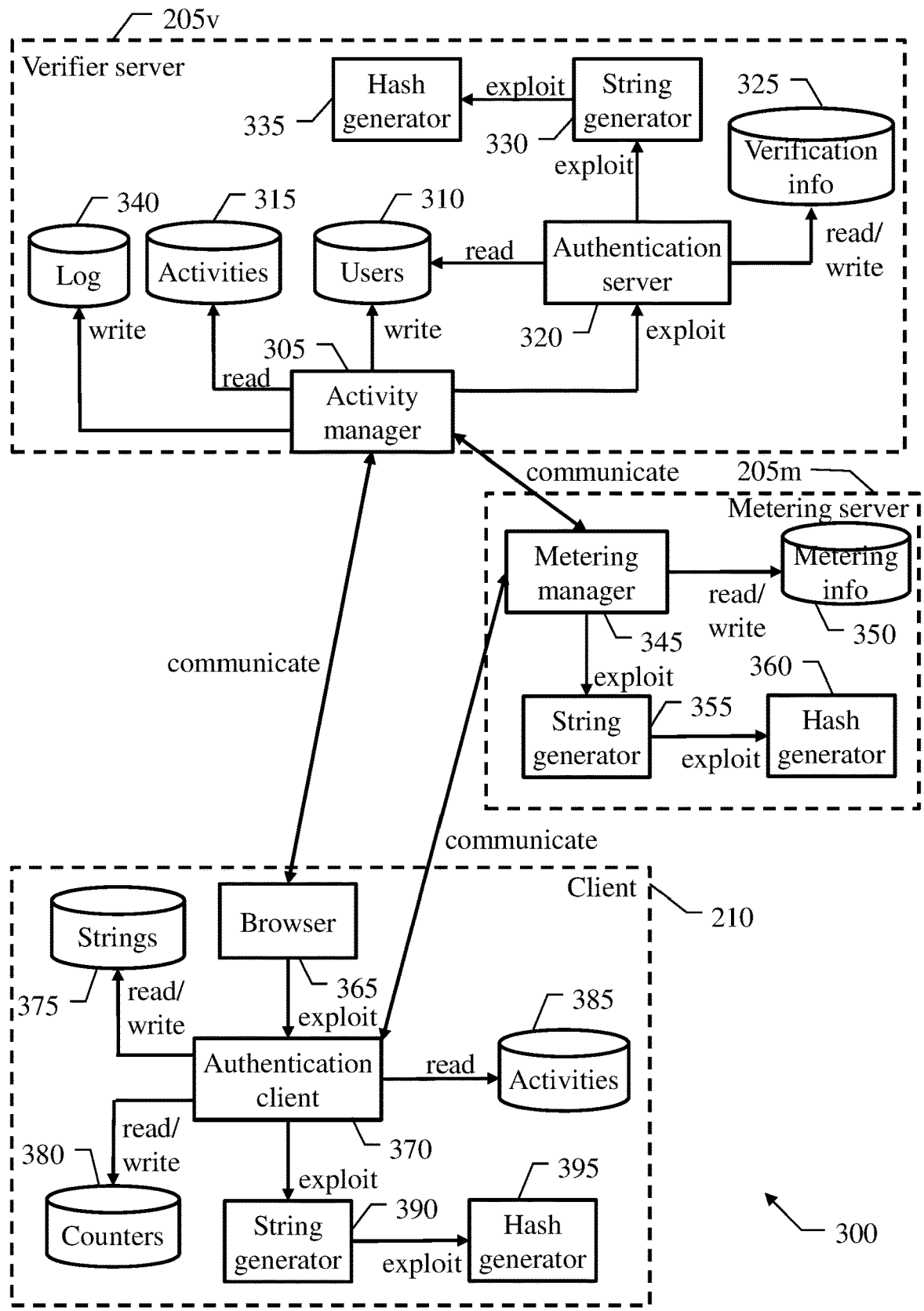
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300. The software components are typically stored in the mass memory and loaded (at least partially) into the working memory of each computing system when the programs are running, together with an operating system and other application programs not directly relevant to the solution of the present disclosure (thus omitted in the figure for the sake of simplicity). The programs are initially installed into the mass memory, for example, from removable storage units or from the network. In this respect, each program may be a module, segment or portion of code, which comprises one or more executable instructions for implementing the specified logical function.

Starting from each verifier server 205v (only one shown in the figure), it comprises the following components.

An activity manager 305 (for example, an application server) manages one or more activities that may be performed only by (authorized) users that are registered with it. For example, the activities are services whose invocation is restricted, such as relating to home-banking, e-commerce, project management and so on, and/or actions on protected hardware/software resources, such as operating system, virtualization layer, software application, machine, peripheral, network and so on; these activities may be performed either directly on the verifier server 205v or indirectly on other server(s), not shown in the figure, under its control. The activity manager 305 writes a user's repository 310, which defines the authorized users. The user's repository 310 has an entry for each authorized user. The entry stores personal information about the authorized user (such as name, e-mail, telephone number and so on, provided that the authorized user has given the required permission), his/her userID (used to identify the authorized user) and his/her possible entitlements (indicating the activities that the authorized user is allowed to perform). In case the authentications are metered, the entry also stores corresponding metering information; for example, the metering information indicates a total number $N_{tot}$ of authorizations that have been allotted to the user, a periodic number $N_{per}$ of authorizations that are allotted to the user every pre-defined period (such as per day, week, month and so on) and/or a limit number $N_{lim}$ of authorizations that may be left available to the user at any time. The activity manager 305 reads an activities repository 315. In case the authentications are metered and multiple activities with different weights may be performed by the authorized users, the activities repository 315 indicates how these activities contribute to consume the authorizations. The activities repository 315 has an entry for each activity; the entry stores a cost value that indicates the number of authentication strings that are required for performing the activity (for example, in case of activities performed on a database they may be differentiated with cost values of 1 for a selection, 10 for an update and 100 for a dump). The activity manager 305 exploits an authentication server 320. The authentication server 320 authenticates the users whenever it is necessary (for example, when each user requests to access the activity manager 305 and/or when each user requests to perform critical operations such as e-payments, wire transfers, changing configuration parameters, shutting down machines and so on). The authentication server 320 reads the users repository 310. The authentication server 320 reads/writes a verification repository 325, which contains verification information used to verify the authentications. The verification repository 325 has an entry for each authorized user (for example, indicated by his/her userID). The entry stores the verification string (in clear form since this does not involve any security exposure); moreover, when the authorizations are metered the entry also stores a residual number $N_{res}$ of the authorizations that are still available to the user. The authentication server 320 exploits a string generator 330. The string generator 330 generates the strings of the corresponding chain by applying the one-way function. The string generator 330 in turn exploits a hash generator 335. The hash generator 335 applies a cryptographic hash function (which maps each piece of information of any arbitrary size onto a hash value of fixed size, with a low risk of obtaining the same hash value from different pieces of information, and which is infeasible to invert). The activity manager 305 also writes a log repository 340. The log repository 340 logs information about all the authorization requests that have been processed. The log repository 340 has an entry for each authorization request. The entry stores a time-stamp of the authorization request, the userID of the user that has submitted it, the authentication string that has been used for it, the result of its verification (positive/negative) and the activity that has been performed (in this case as well, with the storing of the authentication strings in clear that does not involve any security exposure).

Moving to each metering server 205m (only one shown in the figure), it comprises the following components.

A metering manager 345 manages the metering of the authentications. The metering manager 345 communicates with the activity manager 305 of each associated verifier server 205v. The metering manager 345 reads/writes a metering repository 350, which contains metering information used to meter the authentications of the authorized users in a specific implementation of the solution according to an embodiment of the present disclosure. The metering repository 350 has an entry for each authorized user (for example, indicated by his/her userID). The entry stores a root string $STR_{roo}$, a reference number $N_{ref}$ and an end number $N_{end}$ that have been used to generate the secret string $STR_0$ and the end string $STR_{end}$, respectively, from the root string $STR_{roo}$. The metering manager 345 exploits a string generator 355, which in turn exploits a hash generator 360 as above.

Moving to each client 210 (only one shown in the figure), it comprises the following components.

A (web) browser 365 is used to navigate (or surf) in the Internet. Particularly, as far as relevant to the present disclosure the browser 365 is used to authenticate the user of the client 210 to the verifier servers 205v. For this purpose, the browser 360 communicates with a user interface that is exposed by the activity manager 305 of each verifier server 205v. In case the client 205 is of an authorized user that is registered with one or more verifier servers 205v, the browser 365 exploits an authentication client 370. The authentication client 370 manages the authentications of the user to each verifier server 205v. The authentication client 370 reads/writes a strings repository 375. The strings repository 375 has an entry for each verifier server 205v with which the user is registered. The entry stores the secret string $STR_0$ used to generate the authentication strings $STR_{aut}$; the entry may also store one or more intermediate strings $STR_{int}$ (between the secret string $STR_0$ and the end string $STR_{end}$ along the chain of strings) together with an (intermediate) number $N_{int}$ of the iterations of the application of the one-way function that have been used to generated them. The strings repository 375 may be stored in clear (when access to the client 205 is controlled by other physical/logical security measures), encrypted with a personal password of the user or even missing (when no intermediate strings $STR_{int}$ are used and the secret string $STR_0$ is entered manually by the user whenever it is necessary). In a specific implementation of the solution according to an embodiment of the present disclosure, the authentication client 370 reads/writes a verification counters repository 380. The verification counters repository 380 contains a verification counter for each verifier server 205v with which the user is registered, which verification counter stores the verification number $N_{ver}$ (in clear form since it is useless without the secret/intermediate strings $STR_0, STR_{int}$). When the authentications are metered, the authentication client 370 reads an activities repository 385. The activity repository 385 has an entry for each verifier server 205v with which the user is registered; the entry stores the cost numbers of the activities that may be performed by the user via the verifier server 205v. The authentication client 370 exploits a string generator 390, which in turn exploits a hash generator 395 as above. Moreover, in case the authentications are metered the authentication client 370 also communicates with the metering manager 345 of the metering servers 205m.

Figure 4A:
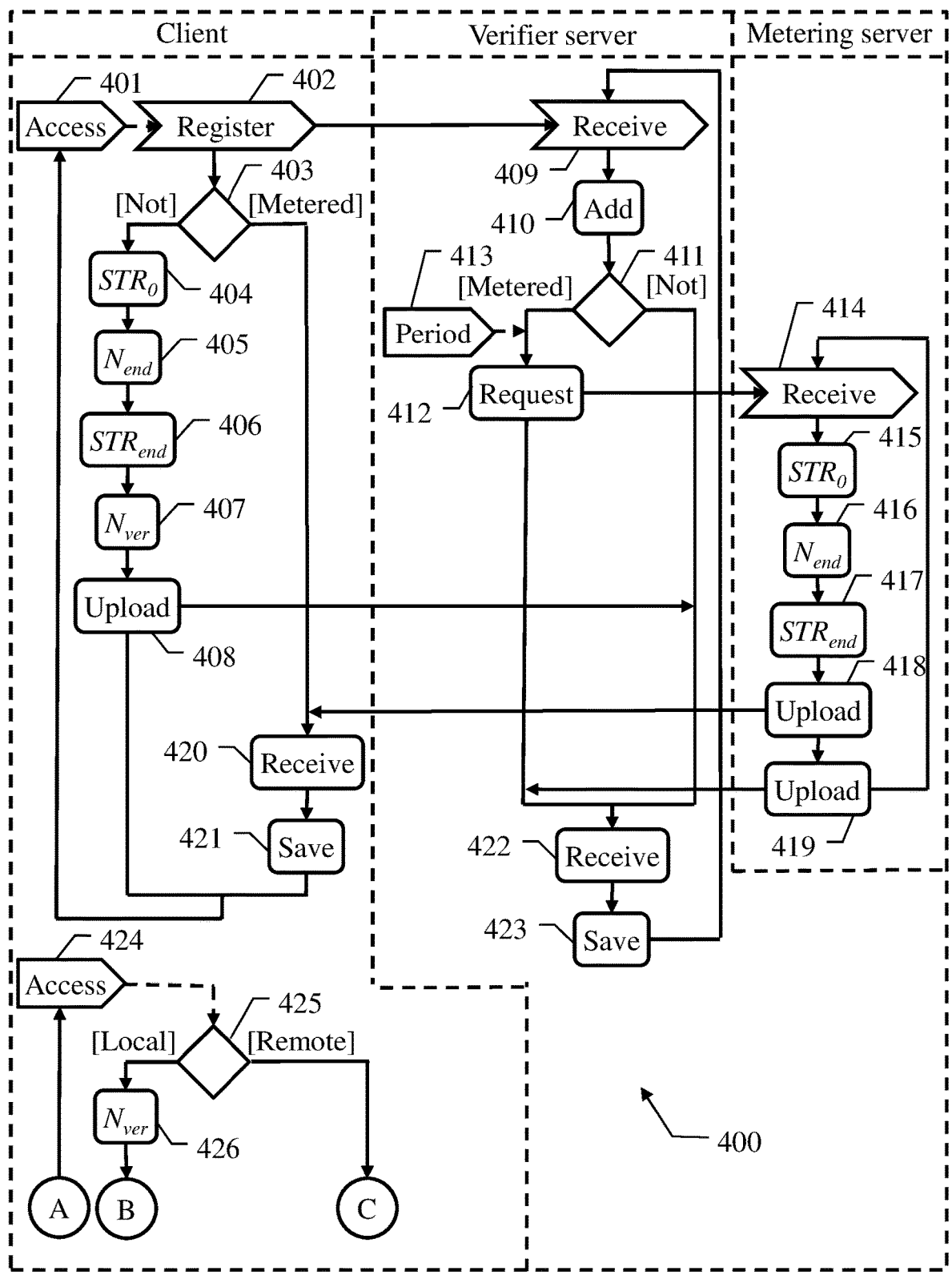
FIG. 4A-FIG. 4C show an activity diagram describing the flow of activities relating to an implementation of the solution according to an embodiment of the present disclosure.
Figure 4B:
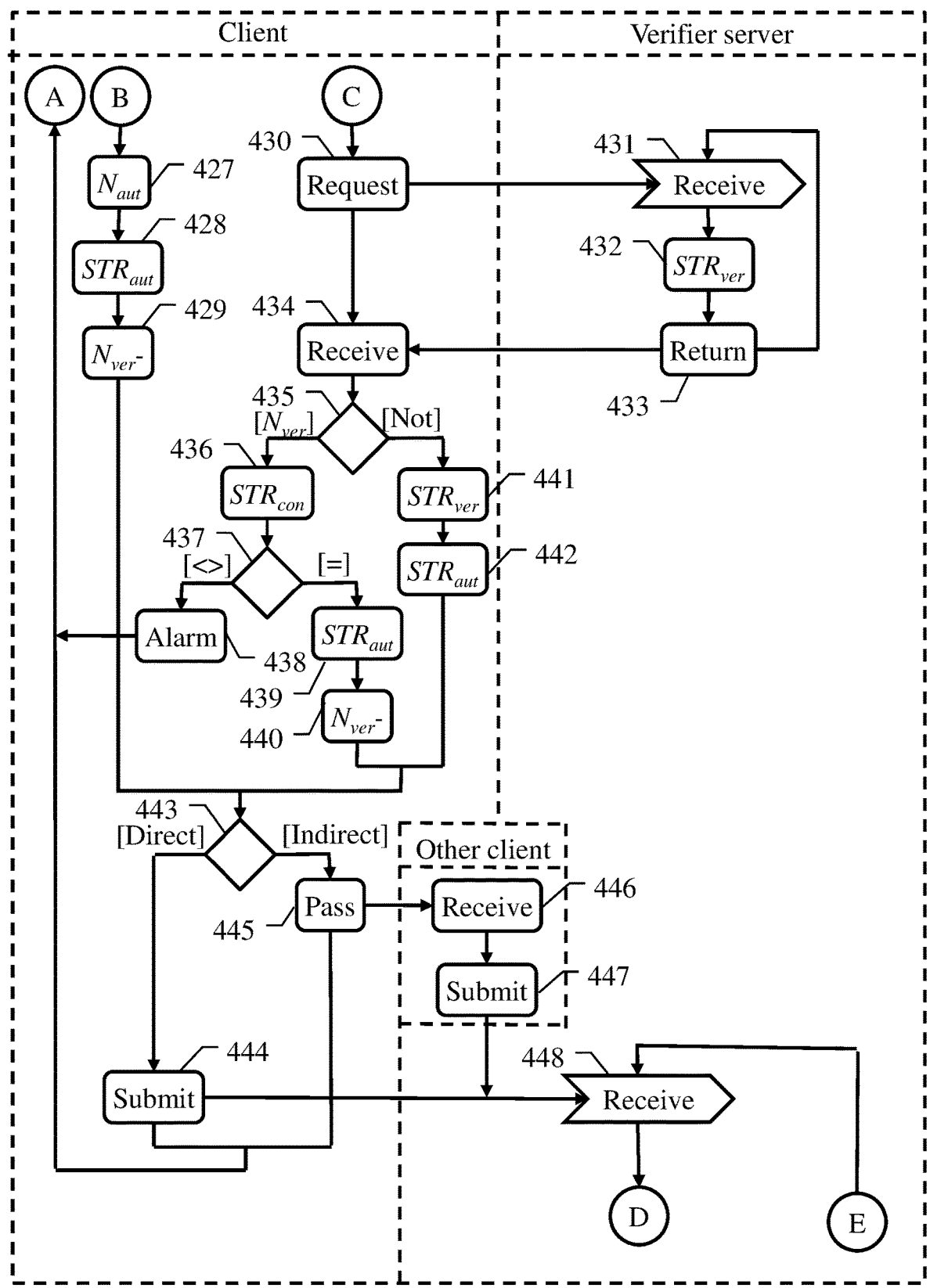
Figure 4C:
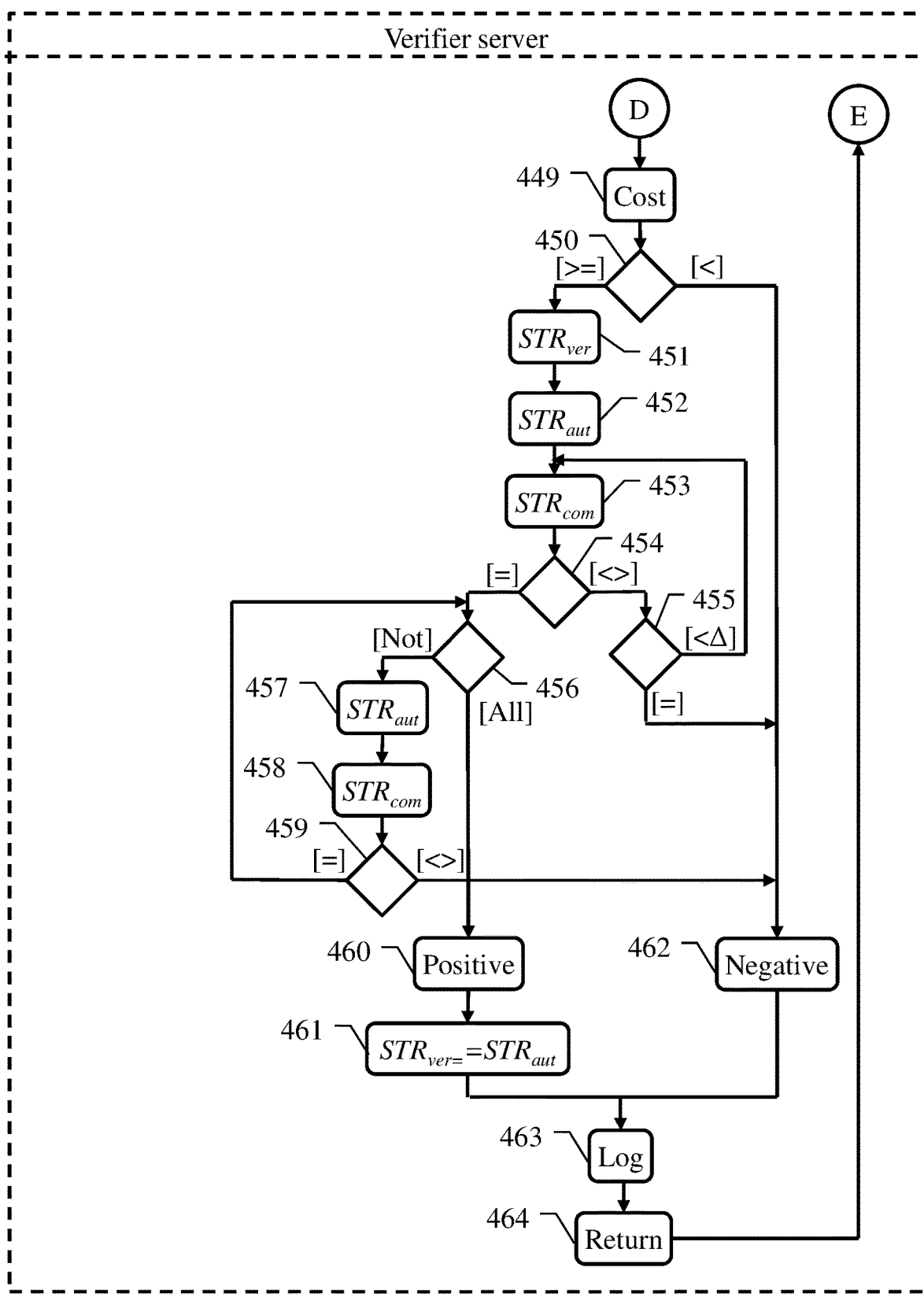

With reference now to FIG. 4A-FIG. 4C, an activity diagram is shown describing the flow of activities relating to an implementation of the solution according to an embodiment of the present disclosure.

Particularly, the diagram represents an exemplary process that may be used to authenticate users with a method 400. In this respect, each block may correspond to one or more executable instructions for implementing the specified logical function on the relevant computing system.

The process passes from block 401 to block 402 in the swim-lane of a generic client when its user needs to access a (new) verifier server. For this purpose, the user registers with it. Particularly, the user accesses the activity manager via the browser for defining the required information, i.e., his/her personal information, userID and possible entitlements; moreover, in case the authorizations are metered, the total number $N_{tot}$ and possibly the periodic number $N_{per}$ and the limit number $N_{lim}$ are defined. The flow of activity branches at block 403 according to how the authorizations are controlled. If the authorization are not metered, the authentication client at block 404 prompts the user to define a (new) secret string (for example, by entering it manually or accepting a value being generated randomly). The secret string has a pre-defined length L (for example, 15-20 characters like letters, numbers and symbols). If necessary, the authentication client saves the secret string into the corresponding repository. The authentication client at block 405 sets the end number $N_{end}$, for example, entered manually or by default. The authentication client at block 406 generates the end string $STR_{end}$. Particularly, the authentication client commands the string generator to apply the one-way function to an (input) string for obtaining a corresponding (output) string; the operation is reiterated for the end number $N_{end}$ of times, with the output string of each iteration that is used as the input string of the next iteration (set to the secret string $STR_0$ at the first iteration). The one-way function is defined so as to transform the input string into the output string with the same length and in the same space of possible values. For this purpose, the string generator commands the hash generator to provide the characters of the output string in succession. For example, each character of the output string is calculated as:

$$C_i = \text{hash}(STR_{in})/i \text{ MOD } N,$$

where $C_i$ is the i-th character of the output string, hash is the (cryptographic) hash function, $STR_{in}$ is the input string and N is the number of possible values of the characters of the strings. In other words, the output string is calculated by expressing the hash value of the input string in base N. For example, in case of strings with length L=20 formed by characters each of which may take N=74 different values, the hash function has to provide at least $L \cdot \log_2(N) = 20 \cdot \log_2(74) \cong 125$ bits, so that a hash function like SHA-256 (providing hash values of 256 bits) is more than sufficient. In this phase, the authentication client may also cache one or more intermediate strings $STR_{int}$ that are generated during the process at corresponding intermediate numbers $N_{int}$ of iterations of the application of the one-way function (with $0 < N_{int} < N_{end}$), for example, every 100.000 iterations over 1.000.000 iterations. The authentication client saves the intermediate strings $STR_{int}$ with their intermediate numbers $N_{int}$ into the corresponding repository. If necessary, the authentication client at block 407 initializes the verification counter (in the corresponding repository) to store the verification number $N_{ver}$ equal to the end number $N_{end}$. The authentication client at block 408 uploads (via the browser) the end string $STR_{end}$ to the verifier server. The process then returns to block 401 waiting for a next registration to a new verifier server.

Referring now to the swim-lane of the verifier server, the activity manager at block 409 receives the information being provided by the user for registering with it from the client (at block 402). In response thereto, the activity manager at block 410 adds a new entry to the user's repository and save this information therein. The flow of activity branches at block 411 according to how the authorizations are controlled. If the authorizations are metered, the process descends into block 412; the same point is also reached from block 413 whenever a period for updating the metering information of any authorized user expires. In response thereto, the activity manager submits an update request for the amount of authentications of the corresponding user to the associated metering server. The update request contains an indication of the user (for example, his/her userID) and its residual number of authorizations $N_{res}$ (retrieved from the verification repository, wherein it is initialized to zero); moreover, in case the update request is for allotting the total number $N_{tot}$ of authorizations it contains its value, whereas in case the update request is for restoring the periodic number $N_{per}$ of authorizations it contains its value, the residual number $N_{res}$ and the possible limit number $N_{lim}$ (extracted from the corresponding repositories).

Moving to the swim-lane of the metering server, the metering manager at block 414 receives the update request (being in a listening condition for it). In response thereto, the metering manager at block 415 creates a (new) secret string $STR_0$ in a random way. The metering manager at block 416 sets the end number $N_{end}$ according to the update request. Particularly, if the update request is for allotting the total number $N_{tot}$ of authorizations, the metering manager sets the end number $N_{end}$ to the total number $N_{tot}$ ($N_{end}=N_{tot}$); conversely, if the update request is for restoring the periodic number $N_{per}$ of authorizations, the metering manager sets the end number $N_{end}$ to the residual number $N_{res}$ incremented by the periodic number $N_{per}$, possibly limiting it to the limit number $N_{lim}$ ($N_{end}=MAX(N_{res}+N_{per},N_{lim})$, where MAX( ) is the max function that returns the higher one of its arguments). The metering manager at block 417 generates the end string $STR_{end}$ as above, by causing the string generator and in turn the hash generator to apply the one-way function iteratively starting from the secret string $STR_0$ for the end number $N_{end}$ of times. The metering manager at block 418 sets the verification number $N_{ver}$ to the end number $N_{end}$, and uploads the secret string $STR_0$ and the verification number $N_{ver}$ to the client (via a secure communication channel). The metering manager at block 419 sets the residual number $N_{res}$ to the end number $N_{end}$; the metering manager then uploads the end string $STR_{end}$ and the residual number $N_{res}$ to the verifier server (in clear form since this does not involve any security exposure).

The same result may also be achieved without the need of updating the end string $STR_{end}$ every times if the metering server stores a root (secret) string $STR_{roo}$ (possible without involving significant security concerns since the metering server is not exposed to the network like the verifier server). In this case, at a first update request for allotting the total number $N_{tot}$ of authorizations, the metering manager creates the root string $STR_{roo}$ in a random way. The metering manager sets the end number $N_{end}$ to a value far higher than the number of authorizations that are expected to be allotted to the client (for example, 10.000.000). The metering generator calculates a reference number $N_{ref}$ equal to end number $N_{end}$ minus the total number $N_{tot}$. The metering generator stores the root string $STR_{roo}$, the end number $N_{end}$ and the reference number $N_{ref}$ into the corresponding repository. The metering manager generates the secret string $STR_0$ as above by causing the string generator and in turn the hash generator to apply the one-way function iteratively starting from the root string $STR_{roo}$ for the reference number $N_{ref}$ of times. The metering manager sets the verification number $N_{ver}$ and the residual number $N_{res}$ to the total number $N_{tot}$. The metering manager uploads the secret string $STR_0$ and the verification number $N_{ver}$ to the client, and it uploads the end string $STR_{end}$ and the residual number $N_{res}$ to the verifier server. At each next update request, the metering manager updates the reference number $N_{ref}$ to meet the update request. Particularly, if the update request is for allotting the total number $N_{tot}$ of authorizations, the metering manager decrements the reference number $N_{ref}$ by the total number $N_{tot}$ ($N_{ref}=N_{ref}-N_{tot}$); conversely, if the update request is for restoring the periodic number $N_{per}$ of authorizations, the metering manager decrements the reference number $N_{ref}$ by a value equal to the residual number $N_{res}$ plus the periodic number $N_{per}$, possibly limited to the limit number $N_{lim}$ ($N_{ref}=N_{ref}-MAX(N_{res}+N_{per},N_{lim})$, where MAX( ) is again the max function that returns the higher one of its arguments). The metering generator stores the (updated) reference number $N_{ref}$ into the corresponding repository (by replacing its previous value). The metering generator generates a (new) secret string $STR_0$ as above by causing the string generator and in turn the hash generator to apply the one-way function iteratively starting from the root string $STR_{roo}$ for the reference number $N_{ref}$ of times. The metering manager sets the verification number $N_{ver}$ and the residual number $N_{res}$ to the previous value of the residual number $N_{res}$ plus the decrement of the reference number $N_{ref}$; the metering manager uploads the secret string $STR_0$ and the verification number $N_{ver}$ to the client, and it uploads the residual number $N_{res}$ to the verifier server.

With reference again to the swim-lane of the client, the authorization client at block 420 receives the secret string $STR_0$ and the verification number $N_{ver}$ (via the browser) from the metering server (at block 418), being in a listening condition for it from block 403 if the authorizations are metered. In response thereto, the authorization client at block 421 saves this information into the corresponding repositories. The process then returns to block 401 waiting for a next registration to a new verifier server.

With reference instead to the swim-lane of the verifier server, the process descends into block 422 from block 412 of directly from block 411 if the authorization are not metered. At this point, the activity manager (being in a listening condition for them) receives the end string $STR_{end}$ from the client (at block 408) or the end string $STR_{end}$ and the residual number $N_{res}$ from the metering server (at block 419). In response thereto, the activity manager at block 423 causes the authentication server to save this information into the corresponding repository. The process then returns to block 409 waiting for a next registration of a new user.

Whenever the user needs to access the verifier server for performing a specific activity, the process passes from block 424 to block 425 in its swim-lane. At this point, the flow of activity branches according to a mode of determination of the verification number $N_{ver}$. If the verification number $N_{ver}$ is determined locally, the authentication client at block 426 retrieves it from the verification counter in the corresponding repository. If the authorizations are metered, the authentication client at block 427 determines the number of authentication strings $STR_{aut}$ that are required for performing the activity from the corresponding repository (set by default to one if the authorizations are not metered). For each of the required authentication strings $STR_{aut}$, the authentication client determines the corresponding authentication number $N_{aut}$ by decrementing the verification number $N_{ver}$ in succession; for example, the authentication number will be $N_{aut}=N_{ver}-1$ for a single authentication string $STR_{aut}$, $N_{aut}=N_{ver}-1$ and $N_{aut}=N_{ver}-2$ for two authentication strings $STR_{aut}$, $N_{aut}=N_{ver}-1$, $N_{aut}=N_{ver}-2$ and $N_{aut}=N_{ver}-3$ for three authentication strings $STR_{aut}$ and so on. The authentication client at block 428 generates each authentication string $STR_{aut}$ corresponding to the application of the one-way function starting from the secret string $STR_0$ for the corresponding authentication number $N_{aut}$ of times. Particularly, the authentication client retrieves an initial string $STR_{ini}$ from the corresponding repository that is closest to the authentication string $STR_{aut}$; the initial string $STR_{ini}$ is the intermediate string $STR_{int}$ having the highest intermediate number $N_{int}$ that is (strictly) lower than the authentication number $N_{aut}$ if available, or the secret string $STR_0$ otherwise. The authentication client generates the authentication string $STR_{aut}$ as above, by causing the string generator and in turn the hash generator to apply the one-way function iteratively starting from the initial string $STR_{ini}$ for a generation number $N_{gen}$ of times corresponding to the authentication number $N_{aut}$; in case the initial string $STR_{ini}$ is the secret string $STR_0$ the generation number $N_{gen}$ is set to the authentication number $N_{aut}$ ($N_{gen}=N_{aut}$), whereas in case the initial string $STR_{int}$ is an intermediate string $STR_{int}$ the generation number $N_{gen}$ is set to the authentication number $N_{aut}$ decremented by the corresponding intermediate number $N_{int}$ ($N_{gen}=N_{aut}-N_{int}$). The use of the intermediate strings $STR_{int}$ allows reducing the time required to generate the authentication strings $STR_{aut}$. This result may also be achieved with a single intermediate string $STR_{int}$ that is cached during the generation of the authentication strings $STR_{aut}$. For this purpose, a (new) intermediate string $STR_{int}$ is saved whenever it will be required for the generation of a next authentication string $STR_{aut}$; this happens when no intermediate string $STR_{int}$ is available or when the authentication number $N_{aut}$ becomes equal to the intermediate number $N_{int}$. In this case, during the generation of the authentication string $STR_{aut}$, the intermediate strings $STR_{int}$ that is generated at the corresponding intermediate number $N_{int}$ of iterations of the application of the one-way function (with $0<N_{int}<N_{aut}$) replaces its previous version into the corresponding repository. The authentication client at block 429 decrements the verification number $N_{ver}$ of the verification counter in the corresponding repository according to the number of the authentication strings $STR_{aut}$ that have been generated (i.e., by setting it to the lowest one of their authentication numbers $N_{aut}$).

Referring back to block 425, if the verification number $N_{ver}$ is determined at least in part remotely, the authentication client at block 430 submits a verification request to the verifier server. Moving to the swim-lane of the verifier server, the activity manager at block 431 receives the verification request (being in a listening condition for it). In response thereto, the activity manager at block 432 retrieves the verification string $STR_{ver}$ (via the authentication server) from the corresponding repository. The activity manager at block 433 returns the verification string $STR_{ver}$ to the client (in clear form since this does not involve any security exposure). The process then goes back to block 431 waiting for a next verification request. With reference again to the swim-lane of the client, the authentication client at block 434 receives the verification string $STR_{ver}$ (being in a listening condition for it from block 430). The flow of activity branches at block 435 according to the availability of the verification number $N_{ver}$ locally as well. If the verification number $N_{ver}$ is available, the authentication client at block 436 causes the string generator and in turn the hash generator to generate a confirmation string $STR_{con}$ corresponding to the application of the one-way function starting from the secret string $STR_0$ for the verification number $N_{ver}$ of times; the operation is performed as above from an initial string $STR_{ini}$ retrieved from the corresponding repository that is closest to the authentication string $STR_{aut}$. The flow of activity further branches at block 437 according to a comparison between the (generated) confirmation string $STR_{con}$ and the (received) verification string $STR_{ver}$. If the confirmation string $STR_{con}$ is different from the verification string $STR_{ver}$, this may be indicative of the fact that one or more authentication strings $STR_{aut}$ have bene used by someone else to authenticate with the verifier server, and then it is possible that the secret string $STR_0$ has been stolen. Therefore, the authentication client at block 438 enters an alarm condition (for example, sending a warning message to the user, such as in a pop-up window, asking him/her to change the secret string $STR_0$ by repeating the operations described-above). The process then returns to block 424 waiting for a next access to the verifier server (after the secret string $STR_0$ has been changed). Referring back to block 437, if the confirmation string $STR_{con}$ is equal to the verification string $STR_{ver}$, the authentication client at block 439 sets the authentication strings $STR_{aut}$ to the last strings that have been generated immediately before the confirmation string $STR_{con}$ during the iterative application of the one-way function. The authentication client at block 440 decrements the verification number $N_{ver}$ in the corresponding repository according to the number of the authentication strings $STR_{aut}$ that have been generated as above. Referring back to block 435, if the verification number $N_{ver}$ is not available, the authentication client at block 441 causes the string generator and in turn the hash generator to apply the one-way function until the verification string $STR_{ver}$ is obtained; the operation is performed as above starting from an initial string $STR_{ini}$ retrieved from the corresponding repository that is closest to the verification string $STR_{ver}$. The authentication client at block 442 sets the authentication strings $STR_{aut}$ to the last strings that have been generated immediately before the verification string $STR_{ver}$ during the iterative application of the one-way function. The process now descends into block 443 from block 429, from block 440 or from block 442.

At this point, the flow of activity branches according to a type of access to the verifier server. Normally, the verifier server is accessed directly by the client. In this case, the authentication client at block 444 submits an authentication request (via the browser) to the verifier server. The authentication request comprises the userID of the user, an indication of the requested activity and the authentication strings $STR_{aut}$ (in clear form since this does not involve any security exposure). Referring back to block 443, the (authorized) user may instead need to allow another (delegated) user (being not registered with the verifier server or not having the required entitlements) to access the verifier server sporadically (such as because of an emergency condition). In this case, the authentication client at block 445 passes the same (authentication) information to the client of the delegated user (for example, via a secure communication channel, manually and so on). The process then returns from block 444 or from block 445 to block 424 waiting for a next access to the verifier server. Moving to the swim-lane of the client of the delegated user, it receives the authentication information at block 446 (automatically or manually). The delegated user at block 447 submits a (delegated) authentication request to the verifier server, by mimicking the authorized user. In this way, the authorized user may allow the delegated user to access the verifier server without the need of sharing the secret string $STR_0$ with him/her (with the risk of its uncontrolled spreading); particularly, this avoids the need of changing the secret string $STR_0$ after its use by the delegated user to invalided possible future attempts to authenticate with the verifier server by third parties.

Moving to the swim-lane of the verifier server, the activity manager at block 448 receives the authentication request (being in a listening condition for it) from either the client of the authorized user (at block 444) or from the client of the delegated user (at block 447). In response thereto, in case the authorizations are metered the activity manager at block 449 retrieves the cost value of the activity being indicated in the authentication request from the corresponding repository. The flow of activity branches at block 450 according to a comparison between the number of authentication strings $STR_{aut}$ provided in the authentication request with the cost value. If the number of authentication strings $STR_{aut}$ is equal to (or higher than) the cost value, always true if the authentications are not metered, the activity manager at block 451 retrieves the verification string $STR_{ver}$ (via the authentication server) from the corresponding repository. The activity manager at block 452 takes a (last) authentication string $STR_{aut}$ (corresponding to the highest authentication number $N_{aut}$) into account. A loop is then entered for verifying the authentication string $STR_{aut}$. The loop begins at block 453, wherein the authentication server generates a comparison string $STR_{com}$ by causing the string generator and in turn the hash generator to apply the one-way function to a result of a previous iteration of the loop, initialized to the authentication string $STR_{aut}$. The flow of activity branches at block 454 according to a comparison between the comparison string $STR_{com}$ and the verification string $STR_{ver}$. If the comparison string $STR_{com}$ is different from the verification string $STR_{ver}$, the authentication server at block 455 verifies the number of iterations being performed against a delta number (for example, 5-15). If the number of iterations is (strictly) lower than the delta number, the process returns to block 453 to repeat the same operations. Referring back to block 454, if the comparison string $STR_{com}$ is equal to verification string $STR_{ver}$, the authentication string $STR_{aut}$ is deemed correct. In this way, it is possible to recover a synchronization between the verification number $N_{ver}$ on the client and the verification string $STR_{ver}$ on the server in case of a slight misalignment between them (for example, due to an authentication request that has not reached the verifier server because of a network problem). For example, a situation is considered wherein the verification string $STR_{ver}$ corresponds to the verification number $N_{ver}$=100. Two authentication strings $STR_{aut}$ corresponding to the authentication numbers $N_{aut}$=96 and $N_{aut}$=97 are received. If the delta number is 5, starting from the authentication string $STR_{aut}$ corresponding to the authentication number $N_{aut}$=97, a comparison string $STR_{com}$ equal to the verification string $STR_{ver}$ is obtained after applying the one-way function iteratively for 3 times (3<5). In response thereto, the loop is exited and the authentication server at block 456 verifies whether a last authentication string $STR_{aut}$ has been verified. If not, the activity manager at block 457 takes a (preceding) authentication string $STR_{aut}$ (corresponding to a lower authentication number $N_{aut}$) into account. The authentication server at block 458 generates a (further) comparison string $STR_{com}$ by causing the string generator and in turn the hash generator to apply the one-way function to the authentication string $STR_{aut}$. The flow of activity branches at block 459 according to a comparison between the comparison string $STR_{com}$ and the previously processed authentication string $STR_{aut}$. For example, in the above-considered situation the comparison string $STR_{com}$ is generated from the authentication string $STR_{aut}$ corresponding to the authentication number $N_{aut}$=96 and it is compared with the authentication string $STR_{aut}$ corresponding to the authentication number $N_{aut}$=97. If the comparison string $STR_{com}$ is equal to the previously processed authentication string $STR_{aut}$, the flow of activity returns to block 456 to repeat the same operations. With reference again to block 456, once all the authentication strings $STR_{aut}$ has been successfully verified (always true in case of a single one), the process descends into block 460. At this point, the authentication server determines a result of the authentication request to be positive. The authentication server at block 461 updates the verification string $STR_{ver}$ accordingly, by setting it to the first authentication string $STR_{aut}$ corresponding to the lowest authentication number $N_{aut}$. The same result may also be achieved by leaving the verification string $STR_{ver}$ unchanged and saving a grant number $N_{gra}$ that indicates the number of authorizations that have been granted to the user up to now. In this case, the comparison strings $STR_{com}$ for the last authentication string $STR_{aut}$ are generated by applying the one-way function iteratively for a number of times incremented by the grant number $N_{gra}$. Whenever the result of the authorization request is positive, the grant number $N_{gra}$ is incremented by the number of the authorization strings $STR_{aut}$. Referring back to block 450, if the number of authentication strings $STR_{aut}$ is lower than the cost value, the process descends into block 462; the same point is also reached from block 455 if the number of iterations has reached the delta number or from block 459 if the comparison string $STR_{com}$ is different from the previously processed authentication string $STR_{aut}$. In all these cases, the authentication server determines the result of the authentication request to be negative (in the first case since the number of authentication strings $STR_{aut}$ are not sufficient for performing the activity and in the other cases because the identity of the user has not been confirmed), possibly sending a warning message to the user via a different channel (such as by e-mail). The flow of activity merges again at block 463 from block 461 or from block 462. The activity manager now updates the log repository accordingly. The activity manager at block 464 returns the result of the authentication to the corresponding client (of either the authorized user or the delegated user), by granting or denying the access to the verifier server in case of positive result or negative result, respectively (in the first case, with the user of the client that may then perform the required activity as usual). The process returns to block 448 waiting for a next authentication request.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as defacto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides an authentication method. However, the method may be used to authenticate any user (for example, person, software, hardware and so on) and for any purpose (for example, by authenticating a client with a server for invoking services, executing actions, logging-in, approving transactions and the like, for authenticating a server to a client, and so on).

In an embodiment, the method comprises the following steps under the control of a verifier computing system. However, the verifier computing system may be of any type (see below).

In an embodiment, the method comprises storing (by the verifier computing system) a verification string corresponding to applying a one-way function iteratively starting from a secret string for a verification number of times. However, the strings may be of any type (for example, with any length, containing letters, numbers, symbols, any combination thereof and so on); moreover, the verification string may be stored in any way (for example, in clear form, encrypted and so) and it may have been generated everywhere (for example, on the claimant computing system or on the metering computing system with the secret string that is unknown to the verifier computing system, on the verifier computing system itself with the secret string that is then deleted and so on).

In an embodiment, the method comprises receiving (by the verifier computing system) a sequence of authentication requests in association with corresponding one or more authentication strings being generated by applying the one-way function iteratively starting from the secret string for corresponding authentication numbers of times decreasing along the sequence below the verification number. However, the authentication requests may be in any number and received with any timing; moreover, the authentication strings of each authentication request may be in any number and associated with the authentication request in any way (for example, comprised therein, received with a separate message linked thereto and so on), with the authentication strings having been generated in any way (see below).

In an embodiment, the method comprises verifying (by the verifier computing system) each of the authentication requests by generating one or more comparison strings by applying the one-way function iteratively starting from each of the authentication strings of the authentication request corresponding comparison numbers of times at most equal to corresponding delta numbers. However, the one-way function may be of any type (for example, mapping strings in a same space or different spaces, based on any hash function and so on); moreover, the delta numbers may have any value (for example, increasing as the authentication numbers decrease, the same for all of them and so on); moreover, the verification strings may be generated for each authentication string in any number and in any way (for example, up to obtaining the verification string at most for a single delta number of times for the authentication string with the highest authentication number and only a number of times equal to a pitch of the authentication numbers for the other authentication strings, up to obtaining the verification string at most for the corresponding delta number of times for each authentication string, and so on).

In an embodiment, the method comprises determining (by the verifier computing system) a result of each authentication request according to a comparison of the comparison strings with the verification string. However, the comparison may be performed in any way (for example, indirectly by actually comparing the comparison strings of the authentication string with the highest authentication number with the verification string and then comparing the comparison strings of each other authentication string with the previously processed authentication string, directly by actually comparing the comparison strings of each authentication string with the verification string, and so on) and the result of the authentication request may be determined in any way (for example, immediately, requiring a further authentication step and so on).

In an embodiment, the method comprises updating, by the verifier computing system, verification information for verifying a next one of the authentication requests in response to a positive result of each authentication request. However, the verification information may be of any type and updated in any way (for example, the verification string being replaced with the authentication string corresponding to the lowest authentication number, the grant number being incremented by the number of authentication strings, and so on).

Further embodiments provide additional advantageous features, which may however be omitted at all in a basic implementation.

In an embodiment, the method comprises updating (by the verifier computing system) the verification information in response to the positive result of each authentication request by replacing the verification string with one of the authentication strings of the authentication request corresponding to the lowest one of the authentication numbers. However, the verification string may be replaced in any way (for example, by overriding it, keeping a list of its values and so on).

In an embodiment, the method comprises receiving (by the verifier computing system) each of the authentication requests comprising a single one of the authentication strings being generated by applying the one-way function iteratively starting from the secret string for the authentication number of times equal to the verification number minus one. However, the possibility is not excluded of setting the authentication number to the verification number decremented by two or more.

In an embodiment, the method comprises receiving (by the verifier computing system) each of the authentication requests comprising a plurality of the authentication strings being generated by applying the one-way function iteratively starting from the secret string for the corresponding authentication numbers of times having consecutive values up to the verification number minus one. However, the possibility is not excluded of having the authentication numbers with a higher pitch (two or more).

In an embodiment, the method comprises receiving (by the verifier computing system) an end string from a claimant computing system being generated by applying the one-way function iteratively starting from the secret string for an end number of times. However, the end string may be received from any claimant computing system (see below) and in any way (for example, via a message, entered in a web page and so on), being generated thereon in any way (see below).

In an embodiment, the method comprises initializing (by the verifier computing system) the verification string to the end string. However, this operation may be performed at any time (for example, at the registration of the user, later one when the chain of strings has been consumed completely and so on).

In an embodiment, the method comprises receiving (by the verifier computing system) at least part of the authentication requests from the claimant computing system. However, the authentication requests may be received all from the claimant computing system, or one or more of them from other claimant computing systems.

In an embodiment, the method comprises receiving (by the verifier computing system) an end string from a metering computing system being generated by applying the one-way function iteratively starting from the secret string for an end number of times. However, the end string may be received from any metering computing system (see below) and in any way (for example, in push mode, in pull mode and so on), being generated thereon in any way (see below); the end string may be used to initialize the verification string at any time (for example, at the registration of the user, later one when the user has ended the authorizations being allotted thereto, to increment the authorizations allotted to the user periodically and so on).

In an embodiment, the method comprises, for each of the authentication requests, transmitting (by the verifier computing system) the verification string to a claimant computing system to cause the claimant computing system to generate the authentication strings by applying the one-way function iteratively up to obtaining the verification string. However, this operation may be performed at any time (for example, before every authentication request, every predefined number of authorizations being granted, upon explicit request of the user and so on), down to never.

In an embodiment, the method comprises logging (by the verifier computing system) an indication of the authentication requests comprising the corresponding authentication strings. However, the information being logged may be of any type (for example, containing partial, different and additional pieces of information with respect to the ones mentioned above, either individually or in any combination thereof).

An embodiment provides an authentication method comprises the following steps under the control of a claimant computing system. However, the method may be used to authenticate any user and for any purpose (see above); moreover, the claimant computing system may be of any type (see below).

In an embodiment, the method comprises generating (by the claimant computing system) corresponding one or more authentication strings for a sequence of authentication requests corresponding to applying a one-way function iteratively starting from a secret string for corresponding authentication numbers of times decreasing along the sequence below a verification number. However, the strings and the one-way function may be of any type (see above); moreover, the secret string may be of any type (for example, a password, a passphrase, a PIN and so on) and the authentication strings may be in any number and they may be generated in any way (for example, always starting from the secret string or starting from the secret string the first time and then from the closest intermediate string, with the authentication numbers obtained by decrementing the verification number with any pitch, by applying the one-way function for the verification number of times retrieved from a verification counter stored locally or up to generating the verification string received from the verifier computing system, and so on).

In an embodiment, the method comprises submitting (by the claimant computing system) the authentication requests in association with the authentication strings to a verifier computing system storing a verification string corresponding to applying the one-way function iteratively starting from the secret string for the verification number of times. However, the authentication requests may be submitted in any way (for example, directly via a browser, a dedicated application, a command shell and the like, indirectly by passing the corresponding authentication strings to one or more other claimant computing systems and soon); moreover, the authentication strings may be associated with the authentication request in any way and the verification string may be stored in any way (see above).

In an embodiment, this causes the verifier computing system to verify each of the authentication requests by generating one or more comparison strings by applying the one-way function iteratively starting from each of the authentication strings for corresponding comparison numbers of times at most equal to corresponding delta numbers. However, the delta numbers may have any value, and the verification strings may be generated for each authentication string in any number and in any way (see above).

In an embodiment, this causes the verifier computing system to determine a result of each authentication request according to a comparison of the comparison strings with the verification string. However, the comparison may be performed in any way and the result of the authentication request may be determined in any way (see above).

In an embodiment, this causes the verifier computing system to update verification information for verifying a next one of the authentication requests in response to a positive result of each authentication request. However, the verification information may be of any type and updated in any way (see above).

Further embodiments provide additional advantageous features, which may however be omitted at all in a basic implementation.

In an embodiment, the method comprises generating (by the claimant computing system) an end string by applying the one-way function iteratively starting from the secret string for an end number of times. However, the end number may have any value (for example, selected by the user, set by default, fixed by the verifier computing system and so on).

In an embodiment, the method comprises uploading (by the claimant computing system) the end string to the verifier computing system to cause the verifier computing system to initialize the verification string to the end string. However, this operation may be performed at any time (see above).

In an embodiment, the method comprises receiving (by the claimant computing system) the secret string from a metering computing system having generated an end string by applying the one-way function iteratively starting from the secret string for an end number of times and having transmitted the end string to the verifier computing system to cause the verifier computing system to initialize the verification string to the end string. However, this operation may be performed at any time (see above) and in any way (for example, with the metering computing system that changes the end string for every secret string, only changes the secret string by storing the root string and so on).

In an embodiment, the method comprises generating (by the claimant computing system) the authentication strings for each of the authentication requests by applying the one-way function iteratively starting from an initial string for corresponding generation numbers of times based on the corresponding authentication numbers. However, the initial string and then the generation numbers may be of any type (for example, with the initial string equal to the secret string and the generation numbers equal to the authentication numbers, with the initial string equal to the closest intermediate string and the generation numbers equal to the authentication numbers decremented by its intermediate number, and so on).

In an embodiment, the method comprises storing (by the claimant computing system) one or more intermediate strings being generated by applying the one-way function iteratively starting from the secret string for corresponding intermediate numbers of times lower than the verification number. However, the intermediate strings may be in any number and corresponding to any intermediate numbers; moreover, the intermediate strings may be generated in any way (for example, in advance at the generation of the end string or of a first authentication string, when it is necessary because the authentication strings have reached a previous intermediate string, and so on).

In an embodiment, the method comprises generating (by the claimant computing system) each of the authentication strings by applying the one-way function iteratively starting from the initial string being one of the intermediate strings corresponding to the highest one of the intermediate numbers being lower than the corresponding authentication number for the corresponding generation number of times being equal to the corresponding authentication number decremented by the intermediate number of the initial string. However, the initial string may be determined in any way (for example, as the singe intermediate string being available at the moment, by saving a pointer to it or by searching it among multiple available intermediate strings, and so on).

In an embodiment, the method comprises, for each of the authentication requests, retrieving (by the claimant computing system) the verification number from a verification counter stored therein. However, the verification counter may contain any indication of the verification number (for example, the actual verification number, the next authentication number, in clear form, encrypted and so on).

In an embodiment, the method comprises, for each of the authentication requests, generating (by the claimant computing system) the authentication strings by applying the one-way function iteratively starting from the initial string for the corresponding generation numbers of time derived from the verification number. However, the generation numbers may be derived from the verification number in any way (for example, decrementing it by any pitch, possibly reducing it by the intermediate number of the initial string and so on).

In an embodiment, the method comprises, for each of the authentication requests, decrementing (by the claimant computing system) the verification counter according to a number of the authentication strings in response to said submitting the authentication request. However, the verification number may be decremented in any (for example, by overriding it, keeping a list of its values and so on).

In an embodiment, the method comprises, for each of the authentication requests, receiving (by the claimant computing system) the verification string from the verifier computing system. However, this operation may be performed at any time (for example, before submitting the authentication request, in the course of it and so on).

In an embodiment, the method comprises generating (by the claimant computing system) the authentication strings by applying the one-way function iteratively starting from the secret string up to obtaining the verification string. However, this operation may be performed in any way (for example, in alternative to the use of the verification counter, in alternative thereto sporadically and so on).

In an embodiment, the method comprises, for each of the authentication requests, generating (by the claimant computing system) a confirmation string by applying the one-way function iteratively starting from the initial string for a number of times based on the verification number. However, the confirmation string may be generated in any way (for example, from the secret string by applying the one-way function for the verification number of times, from an intermediate string by applying the one-way function for the verification number of times decreased by its intermediate number and so on).

In an embodiment, the method comprises, for each of the authentication requests, entering (by the claimant computing system) an alarm condition according to a comparison between the confirmation string and the verification string. However, the alarm condition may be of any type (for example, preventing the authentication, simply involving the output of a warning message, and so on); moreover, the possibility is not excluded of achieving the same result by applying the one-way function iteratively until the verification string is obtained or the end number is exceeded.

In an embodiment, the method comprises passing (by the claimant computing system) the authentication strings of at least one delegated authentication request of the authentication requests to a further claimant computing system. However, the further claimant computing system may be of any type (for example, either the same or different with respect to the claimant computing system) and for use by any delegated user (for example, a colleague, an expert and so on); moreover, the authentication strings may be passed to the further claimant computing system in any way (for example, transmitted over a network, communicated by voice, over the telephone and so on).

In an embodiment, this causes the further claimant computing system to submit the delegated authentication request in association with the corresponding authentication strings to the verifier computing system. However, this operation may be performed for any purpose (for example, for coping with an emergency, for receiving remote support and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a verifier computing system to perform the method of above when the computer program is executed on the verifier computing system. An embodiment provides a computer program product that comprises one or more computer readable storage media having program instructions collectively stored in said one or more computer readable storage media, the program instructions readable by the verifier computing system to cause the verifier computing system to perform the same method. An embodiment provides a computer program that is configured for causing a claimant computing system to perform the method of above when the computer program is executed on the claimant computing system. An embodiment provides a computer program product that comprises one or more computer readable storage media having program instructions collectively stored in said one or more computer readable storage media, the program instructions readable by the claimant computing system to cause the claimant computing system to perform the same method. However, the program may be implemented as a stand-alone module, as a plug-in for a pre-existing program (for example, the application server or the browser, respectively) or even directly in the latter; moreover, the program may take any form suitable to be used by any verifier/claimant computing system (see below).

An embodiment provides a verifier system comprising means that are configured for performing the steps of the above-described method. An embodiment provides a verifier system comprising a circuitry (i.e., any hardware suitably configured, for example, by software) for performing each step of the same method. However, the verifier system may be of any type (for example, a server, a virtual machine, a cluster and so on). An embodiment provides a claimant system comprising means that are configured for performing the steps of the above-described method. An embodiment provides a claimant system comprising a circuitry (i.e., any hardware suitably configured, for example, by software) for performing each step of the same method. However, the claimant system may be of any type (for example, a laptop, a PC, a smartphone and so on).

Generally, similar considerations apply if the verifier/claimant system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method (CIM) for use with a verifier computing system, the CIM comprising:
    storing a verification string corresponding to applying a one-way function iteratively starting from a secret string for a number of times equal to a verification number indicating a number of desired authentications;
    receiving a sequence of authentication requests in association with corresponding one or more authentication strings, wherein each of the one or more authentication strings corresponds to a respective one of the authentication requests and is being generated by applying the one-way function iteratively starting from the secret string for corresponding authentication numbers of times decreasing by 1 in each of the iterations along the sequence below the verification number;
    verifying each of the authentication requests by:
        generating one or more comparison strings corresponding to each of the respective authentication requests by applying the one-way function iteratively starting from each of the authentication strings of the respective one of the authentication requests corresponding comparison numbers of times at most equal to corresponding delta numbers, wherein each of the delta numbers indicates a number of iterations of the one-way function that may be applied to transform the corresponding authentication string for verification with the verification string,
        determining a result of each of the authentication requests according to a comparison of each of the respective one of the comparison strings with the verification string; and
        updating verification information for verifying a next one of the authentication requests in response to a positive result of each of the authentication requests.

2. The CIM according to claim 1, further comprising:
    updating the verification information in response to the positive result of each authentication request by replacing the verification string with one of the authentication strings of the authentication request corresponding to the lowest one of the authentication numbers.

3. The CIM according to claim 1, further comprising:
    receiving each of the authentication requests comprising a single one of the authentication strings generated by applying the one-way function iteratively starting from the secret string for the authentication number of times equal to the verification number minus one.

4. The CIM according to claim 1, further comprising:
    receiving each of the authentication requests comprising a plurality of the authentication strings being generated by applying the one-way function iteratively starting from the secret string for the corresponding authentication numbers of times having consecutive values up to the verification number minus one.

5. The CIM according to claim 1, further comprising:
    receiving an end string from a claimant computing system being generated by applying the one-way function iteratively starting from the secret string for an end number of times;
    initializing the verification string to the end string; and
    receiving at last part of the authentication requests from the claimant computing system.

6. The CIM according to claim 1, further comprising:
    receiving an end string from a metering computing system being generated by applying the one-way function iteratively starting from the secret string for an end number of times;
    initializing the verification string to the end string; and
    receiving at least part of the authentication requests from a claimant computing system.

7. The CIM according to claim 1, further comprising:
    transmitting, for each of the authentication requests, the verification string to a claimant computing system to cause the claimant computing system to generate the authentication strings by applying the one-way function iteratively up to obtaining the verification string.

8. The CIM according to claim 1, further comprising:
    logging an indication of the authentication requests comprising the corresponding authentication strings.

9. A computer program product (CPP) for use with a verifier computing system, the CPP comprising:
a machine readable storage device; and
computer code stored on the machine readable storage device, with the computer code including instructions for causing a processor(s) set to perform operations including the following:
storing a verification string corresponding to applying a one-way function iteratively starting from a secret string for a number of times equal to a verification number indicating a number of desired authentications,
receiving a sequence of authentication requests in association with corresponding one or more authentication strings, wherein each of the one or more authentication strings corresponds to a respective one of the authentication requests and is being generated by applying the one-way function iteratively starting from the secret string for corresponding authentication numbers of times decreasing by 1 in each of the iterations along the sequence below the verification number,
verifying each of the authentication requests by:
generating one or more comparison strings corresponding to each of the respective authentication requests by applying the one-way function iteratively starting from each of the authentication strings of the respective one of the authentication requests corresponding comparison numbers of times at most equal to corresponding delta numbers, wherein each of the delta numbers indicates a number of iterations of the one-way function that may be applied to transform the corresponding authentication string for verification with the verification string,
determining a result of each of the authentication requests according to a comparison of each of the respective one of the comparison strings with the verification string, and
updating verification information for verifying a next one of the authentication requests in response to a positive result of each of the authentication requests.

10. The CPP according to claim 9, wherein the computer code further includes instructions for causing the processor(s) set to perform the following operations:
updating the verification information in response to the positive result of each authentication request by replacing the verification string with one of the authentication strings of the authentication request corresponding to the lowest one of the authentication numbers.

11. The CPP according to claim 9, wherein the computer code further includes instructions for causing the processor(s) set to perform the following operations:
receiving each of the authentication requests comprising a single one of the authentication strings generated by applying the one-way function iteratively starting from the secret string for the authentication number of times equal to the verification number minus one.

12. The CPP according to claim 9, wherein the computer code further includes instructions for causing the processor(s) set to perform the following operations:
receiving each of the authentication requests comprising a plurality of the authentication strings being generated by applying the one-way function iteratively starting from the secret string for the corresponding authentication numbers of times having consecutive values up to the verification number minus one.

13. The CPP according to claim 9, wherein the computer code further includes instructions for causing the processor(s) set to perform the following operations: receiving an end string from a claimant computing system being generated by applying the one-way function iteratively starting from the secret string for an end number of times;
initializing the verification string to the end string; and
receiving at last part of the authentication requests from the claimant computing system.

14. The CPP according to claim 9, wherein, for each of the authentication requests further comprises:
transmitting the verification string to a claimant computing system to cause the claimant computing system to generate the authentication strings by applying the one-way function iteratively up to obtaining the verification string.

15. The CPP of claim 9 wherein the CPP further includes the processor(s) set and the CPP is in the form of a computer system (CS) for use with a verifier computing system.

* * * * *